United States Patent [19]

Trischman et al.

[11] 4,452,928

[45] Jun. 5, 1984

[54] ADDITIVE-CONTAINING POLYOLEFIN BEADS AND PROCESS FOR THEIR PREPARATION

[75] Inventors: Charles A. Trischman, Kinnelon; Paula S. Weissberger, Mahwah; Robert B. Steinert, Emerson, all of N.J.

[73] Assignee: El Paso Polyolefins Company, Paramus, N.J.

[21] Appl. No.: 440,154

[22] Filed: Nov. 8, 1982

[51] Int. Cl.$^3$ .............................................. C08J 3/20
[52] U.S. Cl. .................................... 523/206; 523/201; 523/210; 524/528; 428/407
[58] Field of Search ...................... 523/210, 206, 201; 524/528; 428/407

[56] References Cited

U.S. PATENT DOCUMENTS

| | | | |
|---|---|---|---|
| 2,966,474 | 12/1960 | Jargeleit | 524/528 |
| 3,455,871 | 7/1969 | Coover et al. | 260/41 |
| 3,669,722 | 6/1972 | Bishop | 117/100 |
| 4,039,507 | 8/1977 | Paige et al. | 524/528 |
| 4,045,403 | 8/1977 | Lever et al. | 524/528 |
| 4,165,406 | 8/1979 | Tagukuni et al. | 428/407 |
| 4,256,805 | 3/1981 | Tagukuni et al. | 428/357 |

*Primary Examiner*—Carman J. Seccuro
*Attorney, Agent, or Firm*—Fred S. Valles; Margareta LeMaire

[57] ABSTRACT

The invention provides an additive-containing polyolefin having an inner bead of a first polyolefin and an outer adherent coating of a second polyolefin encapsulating the additive.

15 Claims, 1 Drawing Figure

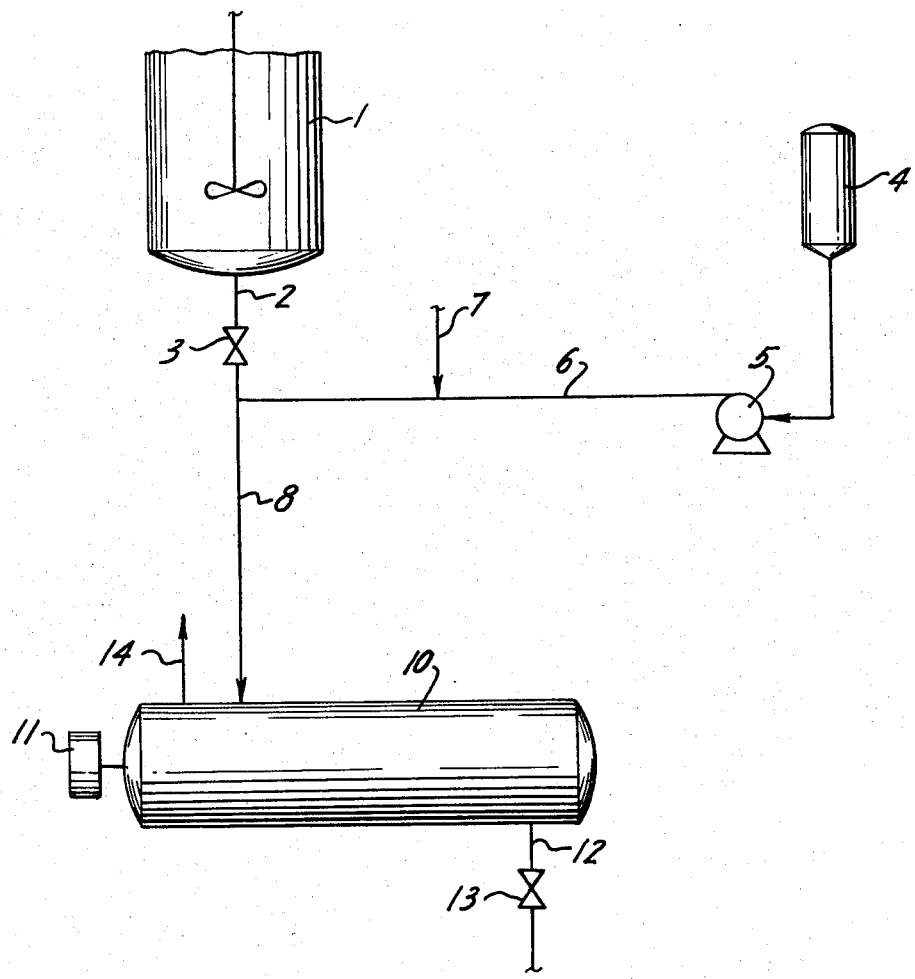

ADDITIVE-CONTAINING POLYOLEFIN BEADS AND PROCESS FOR THEIR PREPARATION

BACKGROUND OF THE INVENTION

Recently new catalysts have been developed which are far more active than conventional catalysts in the polymerization of alpha-olefins. Briefly described, these catalysts are comprised of a titanium halide catalyst component supported on magnesium dihalide and an alkylaluminum compound, which can be present as a complex with an electron donor compound. These catalyst components have been described in the patent literature, e.g., in U.S. Pat. Nos. 3,830,787, 3,953,414, 4,051,313, 4,115,319, 4,149,990, 4,218,339, 4,220,554, 4,226,741 and 4,263,169.

Catalysts of these types function well in the homo and copolymerization of alpha-olefins having from 2 to 18 carbon atoms particularly when the process is carried out under slurry conditions using a liquid hydrocarbon diluent, which can be liquid monomer, inert hydrocarbon or a mixture of such compounds.

The productivities obtained with these new catalysts are extremely high resulting in polymers containing such small quantities of residual catalyst that the conventional deashing step can be dispensed with.

Further improvements in overall process economics have been achieved by the use of spherical or spheroidal-shaped supported titanium halide catalyst compounds in slurry polymerizations of alpha-olefins. The polymer produced under such conditions is in the shape of free-flowing beads obviating the need for melt extruding the polymer into pellets before shipment of the product to the user. One disadvantage, however, of eliminating the melt extrusion step is that it becomes extremely difficult to homogenously incorporate any of the various additives that may be a desired component of the final polymer product without resorting to a compounded master batch technique, which is expensive.

It is, therefore, an object of the present invention to provide a novel additive-containing polymer product in bead form.

Another object of the invention is to provide a process for the production of an additive-containing polymer in bead form.

THE FIGURE

FIG. 1 shows a schematic flow diagram of one embodiment of the process of this invention.

THE INVENTION

In accordance with this invention there is provided an additive-containing alpha-olefin polymer comprising an inner bead of a first polyolefin and an adhering outer coating of a second polyolefin being intermixed with at least one additive compound.

The inner polymer bead is a polymer of one or more alpha-olefins having from 2 to 18 carbon atoms in the molecule. Specific examples of suitable polymers are polyethylene, polypropylene polybutene-1 etc., copolymers of ethylene and propylene, copolymers of propylene and butene-1, interpolymers of ethylene with at least one other alpha-olefin containing from 4 to 18 carbon atoms in the molecular, preferably containing from 4 to 8 carbon atoms. Included within the latter group are the recently developed linear low density polyethylenes having typical densities in the range of 0.910 to about 0.935.

The resin portion of the outer coating is a second polyolefin having a relatively high solubility in hydrocarbon solvents compared to that of the inner bead resin. The essential difference in resin solubilities can be due to the resins being different in (a) chemical composition, (b) polymerized monomer proportions, (c) molecular weight, or (d) isotactic content. The second resin can be a polymer of one or more alpha-olefins having from 2 to 18 carbon atoms in the molecule. Specific examples of suitable polymers are polyethylene, polypropylene, polybutene-1 etc., copolymers of ethylene and propylene, copolymers of propylene and butene-1, interpolymers of ethylene with at least one other alpha-olefin containing from 4 to 18 carbon atoms in the molecule, preferably containing from 4 to 8 carbon atoms. The weight ratio of coating (second polymer) resin to inner bead (first polymer) resin is generally maintained between about 0.5:100 and about 10:100, preferably between about 0.7:100 and about 6:100.

The additive can be one or more of the various compounds usually incorporated into polyolefin resin such as antioxidants, metal deactivating agents, heat and light stabilizers, lubricants, antiblock and antistatic agents, slip additives and others. The additives are provided in quantities known to be effective for their respective function. In general, the concentration of these additives range from about 0.01 to about 5 percent based on the total weight of the bead and the outer coating resins.

The process for producing the coated beads of this invention broadly involves intimately contacting uncoated beads of the first polyolefin resin with a mixture of the additive and a solution of the second polyolefin resin in a hydrocarbon solvent, evaporating the solvent in at least one evaporation zone and recovering beads coated with precipitated second resin in admixture with the additive.

The hydrocarbon solvent is suitably one containing olefinic or paraffinic hydrocarbons which evaporate under the process condition maintained in the evaporation zone or zones. Examples of preferred hydrocarbons are propylene, propane, butene-1, butane, pentene-1 and pentane. $C_6$ and higher olefin and paraffin hydrocarbon solvents can also be used if the evaporation is carried out, e.g., at sub-atmospheric conditions and/or elevated temperatures, which must be below that of the tacky point of the olefin polymer to avoid agglomeration of the polymer particles. The tacky point of the olefin polymer is defined as that temperature at which the surfaces of the polymer beads become sufficiently soft so as to be tacky and tend to stick to one another and to other surfaces. The amount of hydrocarbon solvent used in the process is not too critical as long as it is sufficient to wet the beads. Usually the solvent to total polyolefins weight ratio is maintained between about 2:98 and about 80:20, preferably between about 10:90 and 60:40.

Preferably, the solvent is the same as the liquid diluent used in preparing the polymer beads by slurry polymerization techniques. In such a process the required polymer of higher solubility is formed in situ in the polymerization reactor and is present in a dissolved state in the liquid diluent. Subsequent to discharge of the reactor effluent stream (containing solid beads of a first polymer and diluent with dissolved second polymer) through a discharge valve, the desired additives are injected into the stream and dispersed with the beads prior to evaporation and separation of the diluent. As evaporation is taking place the dissolved polymer precipitates as a residue, which encapsulates the additives with the polymer beads, preventing separation in subsequent handling operations. The additive may be provided in the form of a pumpable solution or a suspension in a suitable carrier, such as mineral oil, petrolatum, inert hydrocarbons, etc. Alternately, they may be added directly with or without a diluent flush stream.

The process of this invention in a preferred embodiment is depicted in the attached drawing which forms part of the invention and illustrates a process flow for carrying out adherent additive coating of polymer beads, in this case, beads of a copolymer of ethylene and butene-1 (linear low density polyethylene).

In the drawing reactor 1 is an agitated pressure vessel of which only the lower discharge portion is shown. In the reactor ethylene and butene-1 are copolymerized in the presence of butane under conditions of elevated pressure and temperature such that butane and butene-1 are present in liquid phase and thus both serving as diluent in the process. A spherical catalyst system, e.g., that covered by U.S. Pat. No. 3,953,414 is used for the reaction. The reaction effluent (a slurry of monomer diluent, solid polymer beads and dissolved polymer) is continuously withdrawn through line 2 and pressure letdown valve 3. In vessel 4 the desired additives are mixed with a liquid carrier, e.g., mineral oil, and fed by means of pump 5 through conduit 6 into line 8 where it is intimately mixed with the reactor effluent flowing through valve 3 and discharged into evaporation zone 10. To facilitate the flow of the additive mixture into line 8 a flush stream (e.g. butane) can, if desired, be introduced through line 7. Evaporation zone 10 (dryer) is suitably equipped with a driving gear 11 to actuate paddles, ribbons or other means (not shown) for agitating the beads and promote the rate of evaporation. Vapors are withdrawn through line 14 and taken to a recovery/recycle loop, while coated pellets, containing encapsulated additives are withdrawn through line 12 and valve 13 for further drying in another vessel (not shown), if so required.

The following is an example of the operation of this process.

EXAMPLE 1

In operation, the process of this invention was carried out in units as shown in the drawings by continuously introducing 27.6 pounds/hr ethylene, 62 pounds/hr total $C_4$ hydrocarbons (about 34 mol % butene-1, the remaining portions being n-butane), a catalyst composition of spherical titanium halide-magnesium halide-triethylaluminum in mole ratio of Al/Ti of 178 and in sufficient quantity to result in a productivity of 408,000 lbs. polymer per lb. of Ti metal (Ti content of supported catalyst component equal to about 2.5 wt %). Hydrogen was introduced to result in a partial pressure of about 100 psia, the reactor pressure being maintained at 320 psig and temperature of about 140° F. The average residence time in the reactor was about 3 hours. About 91 lbs/hr reactor effluent was withdrawn through line 2 containing about 1.3 lbs. per/hr dissolved ethylene-butene-1 copolymer and 24.2 lb/hr of ethylene-butene-1 solid copolymer beads, the remaining portion of the reactor effluent being mostly butane diluent and butene-1 comonomer.

An additive mixture containing 3.3 wt % antioxidant (Irganox TM 1076, Ciba-Geigy), 4.4 wt % slip additive (Kemamide E TM, Witco), 22.3 wt % antiblock additive (Celite White Mist TM, Johns Manville) in 70 wt % mineral oil (Primoil TM, Exxon) was injected by means of Ruska pump 5 into conduit 8 at a rate of about 225 cc/hr just below discharge valve 3, which reduced the pressure in line 8 to about 15 psig. The flashing additive/effluent mixture was subsequently introduced at about 60° F. into flash dryer (evaporator) 10, where solid product was recovered and further dried in a second dryer. The final product was recovered at about a rate of 25.5 lbs/hr.

The beads were screened to remove any loose material and analyzed for additive content. One mil gauge film samples were also prepared from the resin and the results are shown in Table 1 together with comparative data obtained on samples of unstabilized resin from the same production run.

TABLE 1

| Resin | Unstabilized | Stabilized |
|---|---|---|
| Additives-ppm | | |
| Antioxidant | — | 550[1] |
| Slip | — | 700[1] |
| Antiblock | — | 3500 |
| Physical Properties | | |
| Density-gm/cc | 1.1 | 1.1 |
| Melt Index gm/10 min. | 0.921 | 0.921 |
| Gauge-mil | 1 | 1 |
| Blocking-g/mm | 0.11 | 0 |
| Coeff. of friction-gms | 0.266 | 0.203 |

[1]Calculated

Having thus described the invention and illustrating the process of its operation in a preferred embodiment thereof, it will be understood that various changes and modifications can be made without departing from the scope of the invention.

What is claimed is:

1. A process for the production of an additive-containing alpha-olefin polymer composition comprising:
   intimately contacting beads of a first polyolefin with an additive and a solution of a second polyolefin in a hydrocarbon solvent, the second polyolefin having a higher solubility in hydrocarbon solvents than the first polyolefin;
   evaporating the solvent in at least one evaporation zone, and recovering beads coated with precipated second polyolefin in admixture with the additive.

2. A process according to claim 1, wherein the hydrocarbon solvent is selected from olefinic or paraffinic hydrocarbons containing from 3 to 5 carbon atoms in the molecule, or mixtures of such hydrocarbons.

3. A process according to claim 1, wherein the solvent to total polyolefins weight ratio is maintained between about 2:98 and about 80:20.

4. A process according to claim 1, in which the first polyolefin is a polymer of at least one alpha-olefin having from 2 to 18 carbon atoms in the molecule.

5. A process according to claim 1, in which the first polyolefin is an interpolymer of ethylene and at least one other alpha-olefin containing from 4 to 18 carbon atoms in the molecule.

6. A process according to claim 1, in which the first polyolefin is an interpolymer of ethylene and butene-1.

7. A process according to claim 1, in which the second polyolefin is a polymer of at least one alpha-olefin having from 2 to 18 carbon atoms in the molecule.

8. A process according to claim 1, in which the second polyolefin is an interpolymer of ethylene and at least one other alpha-olefin containing from 4 to 18 carbon atoms in the molecule.

9. A process according to claim 1, in which the second polyolefin is an interpolymer of ethylene and butene-1.

10. A process according to claim 1, in which the weight ratio of the second polyolefin to the first polyolefin is maintained between about 0.5:100 and about 10:100.

11. A process according to claim 10, wherein the weight ratio is between about 0.7:100 and about 6:100.

12. A process according to claim 1, wherein the additive is provided in amounts ranging from about 0.01 to about 5 percent based on the total weight of the first and second polyolefin.

13. A process according to claim 1 wherein the beads of the first polymer and the solution of the second polymer in a hydrocarbon solvent have been produced in situ in a slurry polymerization process employing said hydrocarbon solvent as liquid diluent.

14. A process according to claim 13 wherein the first and second polymers are polymers of at least one alpha-olefin having from 2 to 18 carbon atoms in the molecule.

15. A process according to claim 13 wherein the first and second polymers are interpolymers of ethylene and butene-1 and the hydrocarbon solvent is a mixture of butene-1 and butane in liquid state.

* * * * *